(12) United States Patent
Tanaka (10) Patent No.: US 11,142,086 B2
(45) Date of Patent: Oct. 12, 2021

(54) NON-CONTACT POWER SUPPLY DEVICE

(71) Applicant: DAIHEN Corporation, Osaka (JP)

(72) Inventor: Ryouhei Tanaka, Osaka (JP)

(73) Assignee: DAIHEN Corporation, Osaka (JP)

( * ) Notice: Subject to any disclaimer, the term of this patent is extended or adjusted under 35 U.S.C. 154(b) by 199 days.

(21) Appl. No.: 16/510,110

(22) Filed: Jul. 12, 2019

(65) Prior Publication Data

US 2020/0031246 A1  Jan. 30, 2020

(30) Foreign Application Priority Data

Jul. 24, 2018  (JP) .............................. JP2018-138864

(51) Int. Cl.
| | |
|---|---|
| *B60L 53/30* | (2019.01) |
| *H02J 7/02* | (2016.01) |
| *B60L 53/12* | (2019.01) |
| *H02J 50/12* | (2016.01) |
| *H02J 50/60* | (2016.01) |
| *H02J 50/80* | (2016.01) |

(52) U.S. Cl.
CPC ............... *B60L 53/30* (2019.02); *B60L 53/12* (2019.02); *H02J 7/025* (2013.01); *H02J 50/12* (2016.02); *H02J 50/60* (2016.02); *H02J 50/80* (2016.02)

(58) Field of Classification Search
CPC .......... B60L 53/30; B60L 53/12; B60L 53/36; B60L 53/124; H02J 7/025; H02J 50/60; H02J 50/12; H02J 50/80; H02J 7/0049; H02J 2310/48; H02J 50/90; Y02T 90/12; Y02T 90/14; Y02T 10/7072; Y02T 10/70

See application file for complete search history.

(56) References Cited

U.S. PATENT DOCUMENTS

| | | | | |
|---|---|---|---|---|
| 10,935,989 | B2* | 3/2021 | Smits | G01C 21/3461 |
| 10,953,791 | B2* | 3/2021 | Lisseman | B60Q 3/283 |
| 2015/0073642 | A1* | 3/2015 | Widmer | G01C 21/36 |
| | | | | 701/22 |
| 2017/0043672 | A1* | 2/2017 | Araki | B60L 53/302 |
| 2018/0118043 | A1* | 5/2018 | Lee | B60L 53/18 |

FOREIGN PATENT DOCUMENTS

JP           2010-239845 A    10/2010

* cited by examiner

*Primary Examiner* — Stacy Whitmore
(74) *Attorney, Agent, or Firm* — Rudy J. Ng; Bret E. Field; Bozicevic, Field & Francis LLP (57) ABSTRACT

A non-contact power supply device 1 supplying power in a non-contacting manner to a battery 51 provided in an electric vehicle 5, includes a guide 20 that defines a stopping position of the electric vehicle 5 when the electric vehicle 5 is supplied with power in the non-contacting manner; and a power transmitter 10 that includes a power transmission coil Lt and a housing 110 accommodating the power transmission coil Lt and that transmits power to the electric vehicle 5 stopped at the stopping position from the power transmission coil Lt, wherein the guide 20 includes two guide parts 21, 21 disposed apart from each other in a width direction of the electric vehicle 5 with a space greater than a width of the electric vehicle 5, and a vehicle stopper 22 that is disposed at a far side in a moving direction of the electric vehicle 5.

4 Claims, 9 Drawing Sheets

NON-CONTACT POWER SUPPLY DEVICE

CROSS-REFERENCE TO RELATED APPLICATIONS

This nonprovisional application claims priority under 35 U.S.C. § 119(a) on Patent Application No. 2018-138864 filed in Japan on Jul. 24, 2018, the entire contents of which are hereby incorporated by reference.

FIELD

The present invention relates to a non-contact power supply device.

BACKGROUND

An electric vehicle such as an electric automobile driven by an electric motor, a plug-in hybrid electric vehicle driven by an electric motor and an engine in combination and so on have recently been in widespread use. The electric vehicle is provided with a battery to supply power for driving an electric motor. The battery is charged by using an external charging station (see Japanese Patent Application Laid-Open No. 2010-239845, for example).

In the case where the battery in the electric vehicle is charged through the charging station, misalignment between the position of a power transmitter and the position of a power receiver causes a problem of reduction in charge efficiency.

SUMMARY

The present application is made in view of such circumstances and aims at provision of a non-contact power supply device capable of preventing reduction in charge efficiency.

(1) A non-contact power supply device according to one aspect of the present disclosure is a non-contact power supply device supplying power in a non-contacting manner to a battery provided in an electric vehicle, includes a guide that defines a stopping position of the electric vehicle when the electric vehicle is supplied with power in the non-contacting manner, and a power transmitter that includes a power transmission coil and a housing accommodating the power transmission coil and that transmits power to the electric vehicle stopped at the stopping position from the power transmission coil, wherein the guide includes two guide parts disposed apart from each other in a width direction of the electric vehicle with a space greater than a width of the electric vehicle, and a vehicle stopper that is disposed at a far side in a moving direction of the electric vehicle.

In this aspect described above, the guide for defining the stopping position of the electric vehicle is provided, so that the position of the electric vehicle when stopped can be defined, which prevents reduction in charge efficiency due to the misalignment of the stopping position. Furthermore, the guide parts having the space therebetween greater than the width of the electric vehicle is provided, so that the lateral position of the electric vehicle that intends to stop at the stopping position defined by the guide can be corrected. Moreover, the guide includes a vehicle stopper, so that the stopping position in the longitudinal direction of the electric vehicle can be defined.

(2) In the non-contact power supply device according to one aspect of the present disclosure, the space between the two guide parts in the width direction of the vehicle is made wider at an entrance side than at the far side in the moving direction of the electric vehicle.

In this aspect described above, the space between the two guide parts is made wider at the entrance side, which enables the electric vehicle to easily move into the space while the lateral position of the electric vehicle are corrected as the electric vehicle moves into the far side.

(3) In the non-contact power supply device according to one aspect of the present disclosure, the housing that is disposed between the two guide parts and at a position closer to the entrance side than the vehicle stopper, and has an inclined surface inclined toward the far side, and the vehicle stopper has an inclined surface inclined toward the entrance side, and front and rear positions of a wheel of the electric vehicle are restricted between the inclined surface of the housing and the inclined surface of the vehicle stopper.

In this aspect described above, the front and rear positions of the wheels mounted on the electric vehicle are restricted between the inclined surface of the housing and the inclined surface of the vehicle stopper, so that the stopping position of the electric vehicle in the longitudinal direction can be determined, which prevents reduction in charge efficiency due to misalignment of the stopping position.

(4) In the non-contact power supply device according to one aspect of the present disclosure, each of the two guide parts has a height greater than a top surface of the housing.

In this aspect described above, each of the two guide parts has a height greater than the height of the top surface of the housing, so that the wheels of the electric vehicle can be prevented from sticking out of the guide unit when riding over the housing.

(5) In the non-contact power supply device according to one aspect of the present disclosure, the housing includes a cover configured to be opened and closed, and an opening and closing mechanism that opens the cover by a weight of the electric vehicle when the electric vehicle is stopped at the stopping position.

In this aspect described above, the cover is opened when the electric vehicle is stopped, so that an electromagnetic wave from the power transmitting part is not shut off by the cover, which increases charge efficiency. If any foreign object is present on the cover before the cover is opened, the foreign object can be shaken off by the cover being opened, which prevents reduction in charge efficiency due to the presence of the foreign object.

According to the present application, reduction in charge efficiency can be prevented.

The above and further objects and features of the invention will more fully be apparent from the following detailed description with accompanying drawings.

DESCRIPTION OF EMBODIMENTS

The present invention will be described in detail below with reference to the drawings depicting the embodiments thereof.

Embodiment 1

Figure 1:
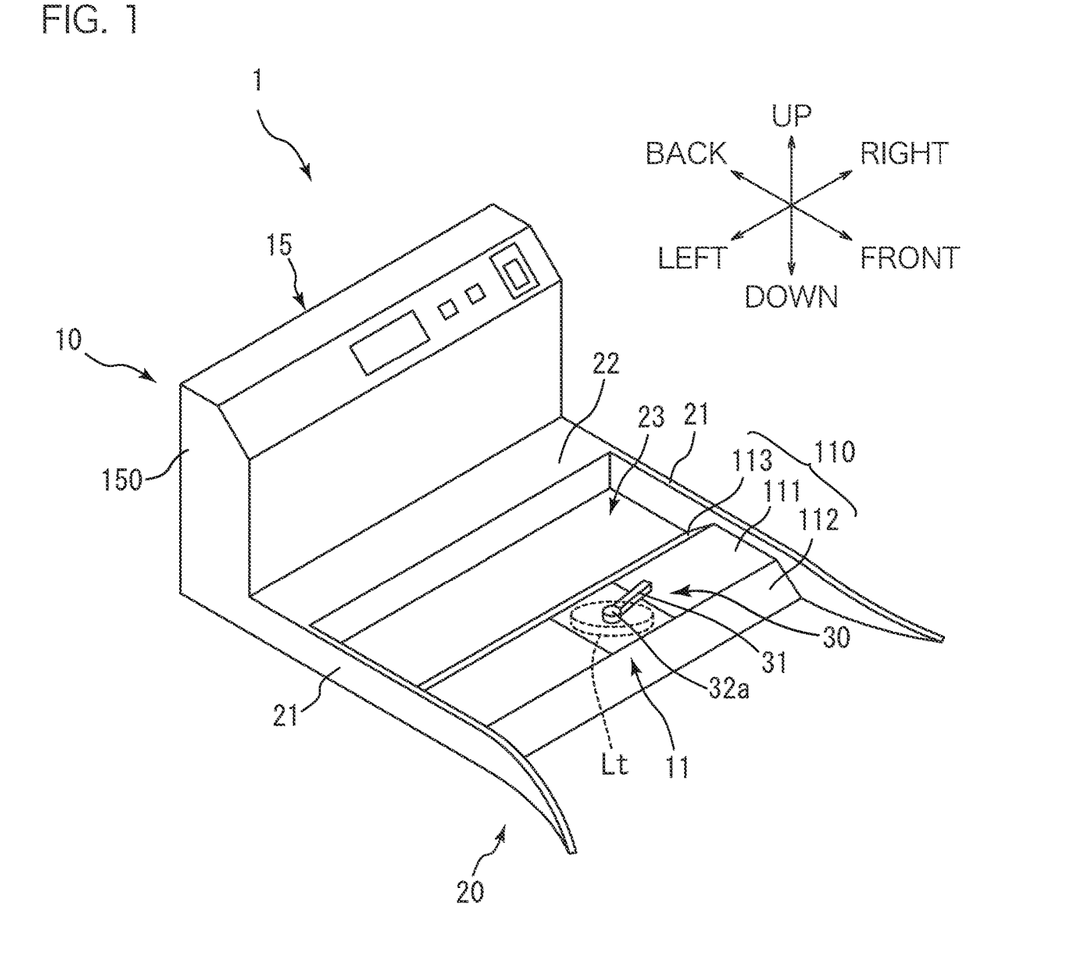
FIG. 1 is a schematic external view illustrating a non-contact power supply device according to Embodiment 1.
Figure 2:
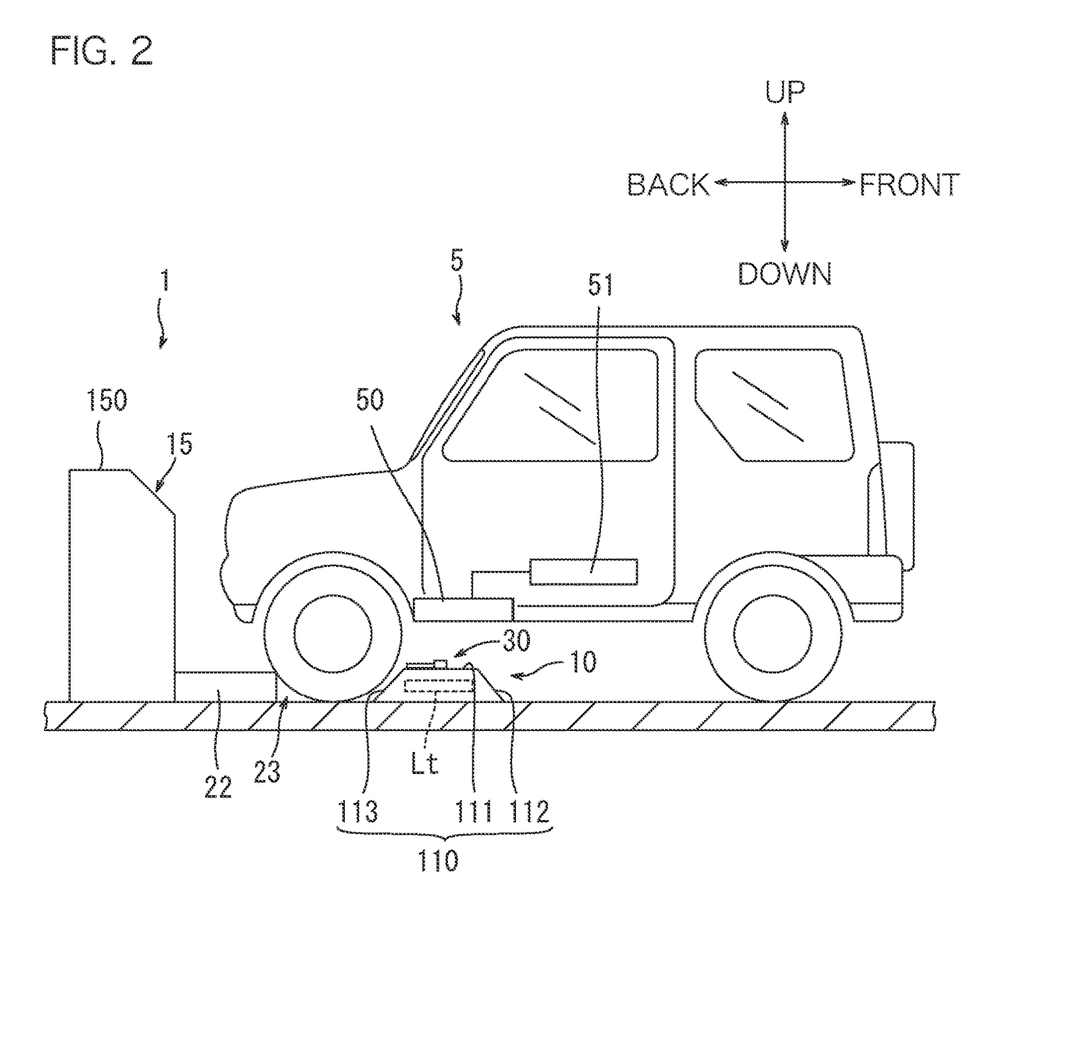
FIG. 2 illustrates a state of supplying power.

FIG. 1 is a schematic external view illustrating a non-contact power supply device 1 according to Embodiment 1 while FIG. 2 illustrates a state of supplying power. The configuration of the non-contact power supply device 1 according to Embodiment 1 will be described below using front and back, right and left and up and down directions indicated by the arrows illustrated in FIGS. 1 and 2.

The non-contact power supply device 1 is provided with a power transmitter 10, a guide unit 20 and a foreign object remover 30. The non-contact power supply device 1 is installed in a parking space and supplies power in a non-contacting manner to an electric vehicle 5 stopped at a predetermined stopping position to thereby charge a battery 51 of the electric vehicle 5. The electric vehicle 5 is a vehicle such as an electric automobile running by a driving force of an electric motor without being provided with an engine, a plug-in hybrid electric vehicle running by using an electric motor and an engine in combination and so on, and is able to run using electric power charged in the battery 51. In Embodiment 1, the power transmitter 10, the guide unit 20 and the foreign object remover 30 are formed as a single unit.

The power transmitter 10 includes a power transmitting part 11 configured to transmit power to the electric vehicle 5 stopped at the stopping position and a power transmission controller 15 for controlling the operation of the power transmitting part 11.

The power transmitting part 11 is provided with a power transmission coil Lt and a housing 110 accommodating the power transmission coil Lt. The housing 110 has a rectangular top surface 111 extending in the left-right direction, a first inclined surface 112 inclined downward from the top surface 111 to the front, a second inclined surface 113 inclined downward from the top surface 111 to the back and a bottom surface (not illustrated) opposite to the top surface 111. The lateral width in the left-right direction of the top surface 111 is little greater than the width of the electric vehicle 5, which is assumed as an object to be charged. The first inclined surface 112 and the second inclined surface 113 are set to a relatively gentle angle of inclination to the extent that the wheels of the electric vehicle 5 can ride over them. It is noted that the top surface 111 is not necessarily flat and may be inclined in the front-back direction or in the left-right direction. If the top surface 111 is inclined in the front-back or left-right direction, foreign object slips off from the top surface 111, which allows the non-contact power supply device to start power supply in the absence of any foreign object.

The power transmission controller 15 includes a housing 150 taking the shape of a rectangular parallelepiped, for example. The housing 150 incorporates therein a high-frequency power source 153 for supplying power to the power transmitting part 11, a controller 151 for controlling power transmission operation and the like (see FIG. 3). The power transmission controller 15 is connected to the power transmitting part 11 through a wiring part not illustrated.

The guide unit 20 includes a left-and-right pair of guide parts 21 and 21 and a vehicle stopper 22 in order to define the stopping position of the electric vehicle 5. Note that FIG. 2 illustrates the configuration from which the guide parts 21 and 21 are removed for the sake of description. The two guide parts 21 and 21 are each formed of a long, narrow board disposed vertical to the ground and are each high enough for the tires (front wheels, for example) of the electric vehicle 5 not to ride over them. It is also preferable that the two guide parts are higher than the top surface 111 of the housing 110 and are high enough for the tires that have passed through the top surface 111 not to ride over them.

The two guide parts 21 and 21 extend along the ground while protruding in the same direction from the front surface of the housing 150 of the power transmission controller 15. In Embodiment 1, the back ends of the guide parts 21 and 21 are connected to the housing 150 of the power transmission controller 15. Furthermore, the front ends of the guide parts 21 and 21 are outwardly curved so as to gradually increase the distance between the guide parts. The power transmitting part 11 described above is provided between the two guide parts 21 and 21. The vehicle stopper 22 is provided integral with the housing 150 on the front side of the housing 150 of the power transmission controller 15. The vehicle stopper 22 extends in the left-right direction so as to join the back ends of the two guide parts.

The distance between the opposite two guide parts 21 and 21 corresponds to the width of the electric vehicle 5. If the electric vehicle 5 advances toward the power transmission controller 15 from an entrance, i.e., the space between the front ends of the two guide parts 21 and 21, the electric vehicle 5 is guided to the stopping position along the guide parts 21 and 21. If the tires (front wheels, for example) of the electric vehicle 5 ride over the housing 110 of the power transmitting part 11 and are stopped in a state that they are in contact with the vehicle stopper 22, the tires of the electric vehicle 5 are fit into a recess part 23 formed between the vehicle stopper 22 and the housing 110 of the power transmitting part 11. The electric vehicle 5 is stopped at a position (stopping position) where the tires of the electric vehicle 5 are fit into the recess part 23. The disposition of the units is so adjusted that the power transmission coil Lt of the power transmitting part 11 is opposite to a power reception unit 50 of the electric vehicle 5 at the stopping position.

The power reception unit 50 of the electric vehicle 5 includes, for example, a power reception coil being magnetically coupled to the power transmission coil Lt on the power transmitting side to receive high-frequency power in the non-contacting manner transmitted from the power transmitting part 11, a rectifying and smoothing circuit for converting the received high-frequency power to direct current (hereinafter referred to as DC) power and supplies the converted DC power to the battery 51 so as to charge the battery 51 of the electric vehicle 5.

Furthermore, the power transmitting part 11 is provided with the foreign object remover 30 for removing foreign object present on the top surface 111 of the housing 110. The foreign object remover 30 includes a blade 31 that moves while being in contact with the top surface 111 of the housing 110 and a drive motor 32 (see FIG. 3) for driving the blade 31.

The drive motor 32 is accommodated in the housing 110 and is provided with a rotating shaft 32a rotating in response to a driving signal output from the controller 151 of the power transmission controller 15.

The rotating shaft 32a is configured to extend perpendicularly upward so as to penetrate the top surface 111 of the housing 110. A sealant may be provided between the rotating shaft 32a and the penetrated surface of the housing 110 in order to prevent any foreign object from entering the inside of the housing 110.

The blade 31 is attached at the end of the rotating shaft 32a. The blade 31 is made of material with high flexibility and high impact resistance, such as resin material or wire, for example. The blade 31 extends along the top surface 111 of the housing 110.

The controller 151 of the power transmission controller 15 outputs a driving signal to the drive motor 32 at a timing before power transmission is started, for example, to thereby rotate the rotating shaft 32a, which drives the blade 31. As the rotating shaft 32a rotates, the blade 31 rotates while being in contact with the top surface 111 of the housing 110 to thereby remove the foreign object present on the top surface 111 of the housing 110.

Note that the timing when the blade 31 is driven can arbitrarily be set. For example, a foreign object detector 155 (see FIG. 3) for detecting any foreign object present on the top surface 111 of the housing 110 is provided. The controller 151 may be configured to drive the blade 31 if any foreign object is detected by the foreign object detector 155. Alternatively, the controller 151 may drive the blade 31 at a timing when the electric vehicle 5 to be charged is detected, at a timing when power transmission is started, at a periodic timing during which no power transmission is made, or the like.

Figure 3:
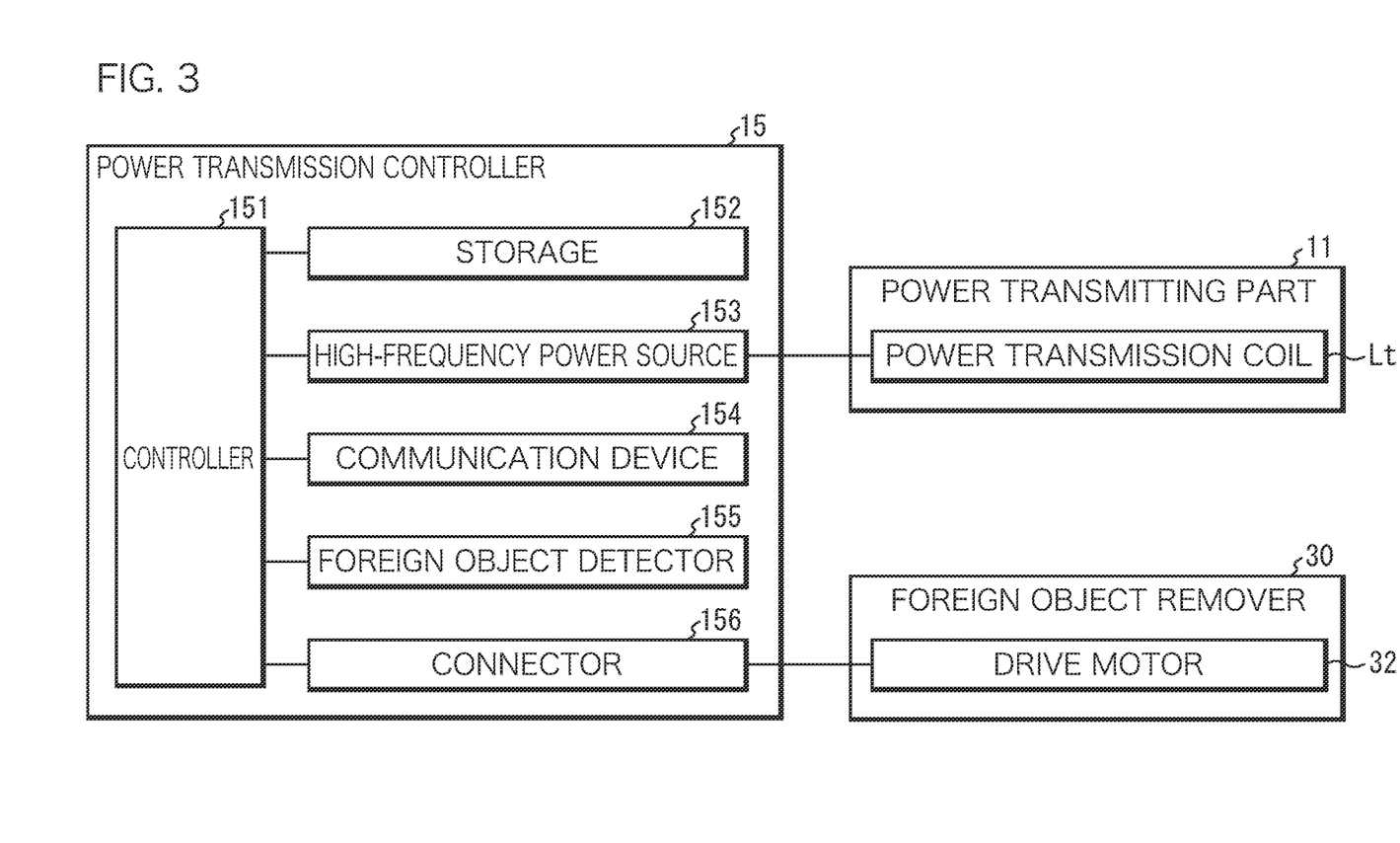
FIG. 3 is a block diagram illustrating the configuration of a control system of the non-contact power supply device.

FIG. 3 is a block diagram illustrating the configuration of a control system of the non-contact power supply device 1. The power transmission controller 15 of the non-contact power supply device 1 is provided with, for example, the controller 151, a storage 152, a high-frequency power source 153, a communication device 154, the foreign object detector 155 and a connector 156.

The controller 151 includes a central processing unit (CPU), a read only memory (ROM), a random access memory (RAM) and so on. In the ROM provided in the controller 151, control programs, etc. for controlling the operation of the hardware units described above are stored. The CPU of the controller 151 executes the control programs stored in the ROM and various programs stored in the storage 152 to thereby control the operation of the hardware units. It is noted that in the RAM provided in the controller 151, data to be temporarily used during the execution of the various programs is stored.

Note that the controller 151 is not limited to the above-described configuration and may be any configuration as long as it corresponds to one or multiple processing circuits including a single-core CPU, a multi-core CPU, a microcomputer, a volatile or nonvolatile memory and so on. Moreover, the controller 151 may be provided with functions such as a clock for outputting date and time information, a timer for measuring the elapsed time from when a measurement starting instruction is provided to when a measurement stop instruction is provided, a counter for counting the number, and so on.

The storage 152 is provided with a storage device employing a static random access memory (SRAM), a flash memory, a hard disk and so on. In the storage 152, various data and various computer programs to be executed by the CPU and the like are stored.

The high-frequency power source 153 is provided with a DC power supply device, an inverter circuit and so on. The DC power supply device rectifies and smooths alternating current voltage input from a commercial power supply by a rectifier circuit and a smoothing capacitor, respectively, to thereby generate DC voltage. The DC power supply device converts the generated DC voltage to DC voltage of a target voltage by a DC-DC converter circuit and outputs the converted DC voltage to the inverter circuit. The inverter circuit is a circuit for converting DC power to high-frequency power and outputs the converted high-frequency voltage to the power transmitting part 11. The inverter circuit is a single-phase full-bridge inverter circuit, for example, and is provided with four switching elements. As a switching element, a metal oxide semiconductor field effect transistor (MOSFET), for example, can be used. A bipolar transistor, an insulated gate bipolar transistor (IGBT), etc. may also be used as a switching element.

The high-frequency power source 153 is connected to the power transmitting part 11 through a wiring part (not illustrated). The power transmitting part 11 is provided with the power transmission coil Lt. The power transmission coil Lt transmits high-frequency power supplied from the high-frequency power source 153 to the electric vehicle 5 to be charged. The power transmission coil Lt is connected in series (or in parallel) with a resonant capacitor not illustrated to form a series resonant circuit (or parallel resonant circuit). The power transmission coil Lt and the resonant capacitor are designed such that the resonant frequency is coincident with the frequency of the high-frequency power supplied from the high-frequency power source 153.

The communication device 154 is provided with a communication interface for making wireless communication with an on-board device (not illustrated) included in the electric vehicle 5. The communication device 154 wirelessly communicates with the on-board device using a wireless transmission system compliant with Bluetooth (registered trademark), WiFi (registered trademark), ZigBee (registered trademark) and other wireless local area network (LAN), or the like. For the communication device 154, an appropriate radio transmission system in view of a radio arrival distance or a transmission bandwidth may be used, and multiple radio transmission systems may be used depending on the circumstances.

The foreign object detector 155 is provided with a device or a sensor for detecting any foreign object present on the housing of the power transmitting part 11. The foreign object detector 155 is provided with an imaging device such as a charge-coupled device (CCD) or a complementary metal oxide semiconductor (CMOS) for imaging the neighborhood of the housing, for example, and detects any foreign object present on the housing by analyzing the image based on an imaging signal input from the imaging device. In this case, the foreign object detector 155 prepares in advance an image where no foreign object is present on the housing and can detect foreign object by detecting the difference between this image and an image newly input.

Alternatively, the foreign object detector 155 may be provided with a thermal sensor for detecting the surface temperature (heat) of the housing 110 provided in the power transmitting part 11. In this case, the foreign object detector 155 can detect foreign object by detecting the presence of a local area having a surface temperature different from that of the surrounding area.

The foreign object detector 155 may employ any known detection method, not limited to the above-described specific detection method. In addition, the foreign object detector 155 may be configured to detect foreign object using multiple detection methods in combination.

The connector 156 is provided with an interface to be connected to the drive motor 32 of the foreign object remover 30. The connector 156 obtains a control signal used for the drive motor 32 output from the controller 151 when the foreign object remover 30 is driven, and outputs the obtained control signal to the drive motor 32.

Figure 4:
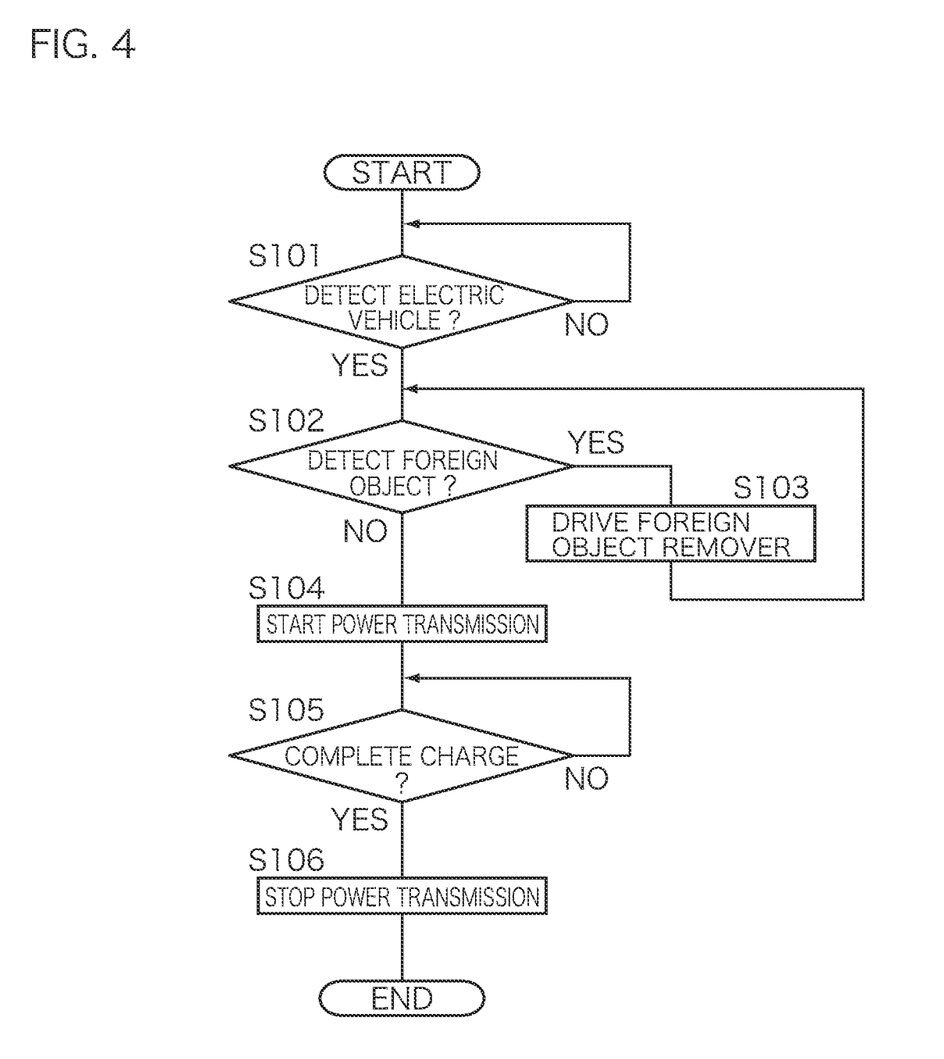
FIG. 4 is a flowchart of an operational procedure of the non-contact power supply device.

FIG. 4 is a flowchart of an operational procedure of the non-contact power supply device 1. The controller 151 of the power transmission controller 15 determines whether or not an electric vehicle 5 to be charged is detected (step S101). The controller 151 may determine that an electric vehicle 5 to be charged is detected if a predetermined communication is made between the communication device 154 and the on-board device provided in the electric vehicle 5, for example. If determining that it is not detected (S101: NO), the controller 151 is held standby until an electric vehicle 5 to be charged is detected.

If determining that an electric vehicle 5 to be charged is detected (S101: YES), the controller 151 determines whether or not any foreign object present on the surface of the housing 110 is detected via the foreign object detector 155 (step S102).

If determining that any foreign object is detected (S102: YES), the controller 151 outputs a control signal for driving the drive motor 32 of the foreign object remover 30 to thereby drive the foreign object remover 30 (step S103). After starting to drive the foreign object remover 30, the controller 151 returns the processing to step S102.

If determining that any foreign object is not detected (S102: NO), the controller 151 outputs high-frequency voltage to the power transmitting part 11 via the high-frequency power source 153 to thereby cause the power transmitting part 11 to start power transmission (step S104).

Next, the controller 151 determines whether or not the battery 51 is completely charged in the target electric vehicle 5 (step S105). The controller 151 may determine that charging is completed if receiving a notification signal indicative of completion of charging from the on-board device of the electric vehicle 5 by the communication device 154, for example. If determining that charging is not completed (S105: NO), the controller 151 is held standby until the charging is completed.

If it is determined that charging is completed (S105: YES), the controller 151 causes the high-frequency power source 153 to stop outputting high-frequency voltage to thereby stop power transmission (step S106).

In the present embodiment, if any foreign object is present on the housing of the power transmitting part 11, the foreign object remover 30 is driven to thereby remove the foreign object. If any foreign metallic object such as a clip, a coin, a nail, etc. is present on the housing, the foreign object may produce heat upon power transmission. The removal of the foreign object by the foreign object remover 30 can prevent the foreign object from producing heat, and can increase safety.

In the present embodiment, the foreign object remover 30 is configured to be driven in the case where the electric vehicle 5 to be charged is detected and where any foreign object present on the housing of the power transmitting part 11 is detected. The foreign object remover 30 may be configured to be driven only for a set time regardless of the presence or absence of foreign object in the case where the electric vehicle 5 to be charged is detected. In this case, the non-contact power supply device 1 does not need to include the foreign object detector 155. In addition, the controller 151 of the power transmission controller 15 may be configured to periodically drive the foreign object remover 30 regardless of the presence or absence of the electric vehicle 5.

In Embodiment 1 as described above, the non-contact power supply device 1 is configured to include the power transmitter 10, the guide unit 20 and the foreign object remover 30 as a single unit, which saves increase in production cost and installation cost.

Furthermore, the non-contact power supply device 1 is provided with the guide unit 20 defining the stopping position of the electric vehicle 5. Thus, the lateral position of the electric vehicle 5 when it is stopped is corrected by the two guide parts 21 and 21 while the longitudinal position thereof is defined by the vehicle stopper 22, which prevents reduction in charge efficiency due to misalignment of the stopping position.

Moreover, the front ends of the two guide parts 21 and 21 are outwardly curved, which allows the electric vehicle 5 to easily advance into the space between the two guide parts 21 and 21, and corrects the lateral position of the electric vehicle 5 as the electric vehicle 5 proceeds into a far side, i.e., the back of the space. Hence, the electric vehicle 5 can be guided to an appropriate stopping position independent of the driving skills of the driver.

Embodiment 2

A modification of the non-contact power supply device 1 will be described in Embodiment 2.

Figure 5:
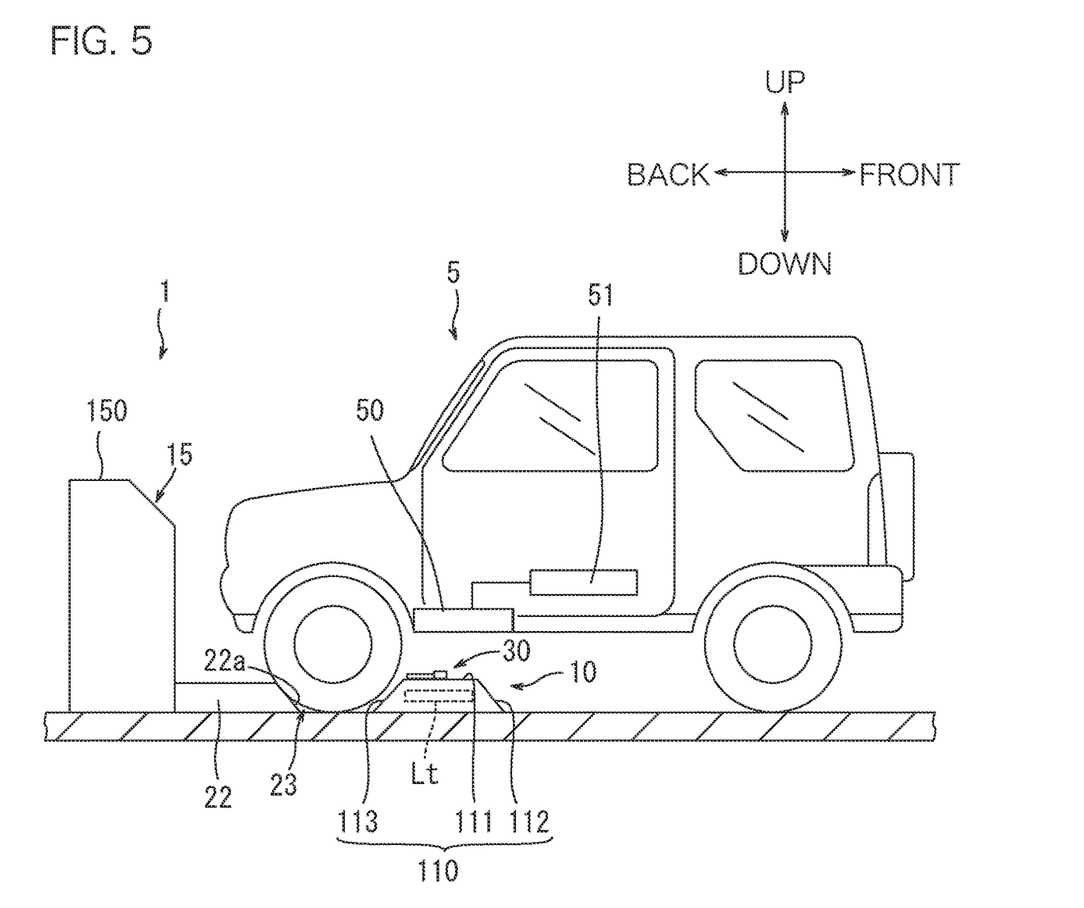
FIG. 5 is a schematic view illustrating a non-contact power supply device according to Embodiment 2.

FIG. 5 is a schematic view illustrating a non-contact power supply device 1 according to Embodiment 2. In Embodiment 2, the vehicle stopper 22 has an inclined surface 22a being inclined to the front. When the electric vehicle 5 to be charged stops at a stopping position defined by the guide unit 20, the tires of the electric vehicle 5 contact the inclined surface 22a of the vehicle stopper 22. The configuration other than the vehicle stopper 22 of the non-contact power supply device 1 according to Embodiment 2 is similar to the configuration of the non-contact power supply device 1 according to Embodiment 1, and the details thereof will not be described here.

The non-contact power supply device 1 is provided with the guide unit 20 for defining the stopping position of the electric vehicle 5, and the longitudinal position of the electric vehicle 5 when it is stopped are defined by the positions of the tires restricted between the inclined surface 22a of the vehicle stopper 22 and the second inclined surface 113 of the housing 110, which prevents reduction in charge efficiency due to misalignment of the stopping position.

Embodiment 3

In Embodiment 1, a configuration in which the power transmitter 10, the guide unit 20 and the foreign object remover 30 are formed as a single unit is described. However, the power transmitter 10 and the guide unit 20 may be formed as separate units.

In Embodiment 3, a configuration in which the power transmitter 10 and the guide unit 20 are formed as separate units will be described below.

Figure 6:
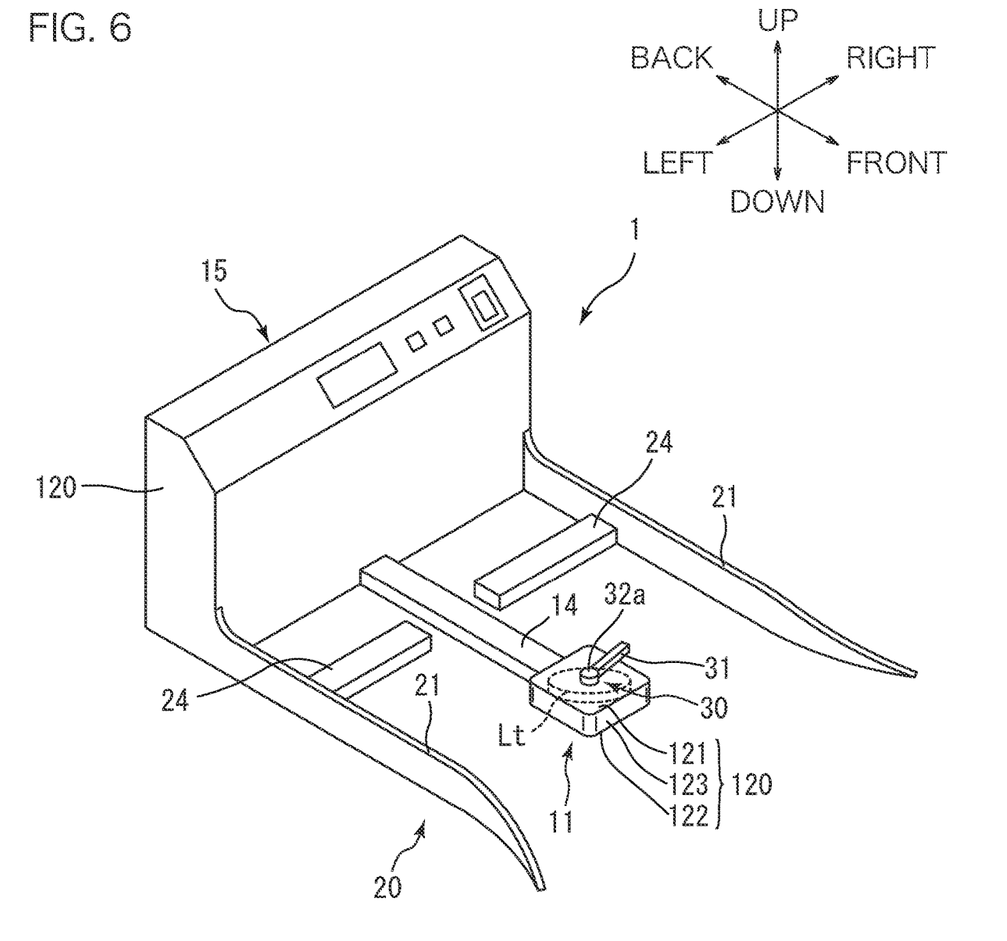
FIG. 6 is a schematic external view illustrating a non-contact power supply device according to Embodiment 3.

FIG. 6 is a schematic external view illustrating a non-contact power supply device 1 according to Embodiment 3. The configuration of the non-contact power supply device 1 according to Embodiment 3 will be described below using front and back, right and left and up and down directions indicated by the arrows illustrated in FIG. 6.

In Embodiment 3, the power transmitter 10 and the guide unit 20 are formed as separate units. The power transmitter 10 includes a power transmitting part 11 configured to transmit power to the electric vehicle 5 stopped at a stopping position and a power transmission controller 15 for controlling the operation of the power transmitting part 11.

The power transmitting part 11 is provided with a power transmission coil Lt and a housing 120 accommodating the power transmission coil Lt. The housing 120 takes the shape of a flat rectangular parallelepiped and has a rectangular top surface 121, a bottom surface 122 disposed opposite to the top surface 121 and a circumferential surface 123 circumferentially disposed between the top surface 121 and the bottom surface 122 such that the top surface 121 and the bottom surface 122 are coupled. The power transmitting part 11 is installed on the ground such that the top surface 121 is exposed. The power transmitting part 11 is connected to the power transmission controller 15 through a wiring part 14. It is noted that the top surface 121 is not necessarily flat and may be a surface inclined in the front-back direction or in the left-right direction. If the top surface 111 is inclined in the front-back direction or in the left-right direction, foreign object slips off from the top surface 111, which allows the non-contact power supply device to start power supply in the absence of any foreign object.

The guide unit 20 includes a left-and-right pair of guide parts 21 and 21 in order to define the stopping position of the electric vehicle 5. The two guide parts 21 and 21 are each composed of a long, narrow board disposed vertical to the ground and are each high enough for the tires (front wheels, for example) of the electric vehicle 5 to ride over them. The two guide parts 21 and 21 extend along the ground while protruding in the same direction from the front surface of the housing 150 of the power transmission controller 15. In Embodiment 3, the guide parts 21 and 21 may be installed independent of the power transmission controller 15 without being connected to the housing 150 of the power transmission controller 15. The front ends of the guide parts 21 and 21 are outwardly curved so as to gradually increase the distance between the guide parts. The power transmitting part 11 described above is provided between the two guide parts 21 and 21.

The guide unit 20 includes vehicle stoppers 24 at the space between the power transmitting part 11 and the power transmission controller 15 and between the two guide parts 21 and 21. The vehicle stopper 24 takes the shape of a rectangular parallelepiped, for example. The distance between the opposite two guide parts 21 and 21 corresponds to the width of the electric vehicle 5, and the guide parts 21 and 21 are provided outside the right-and-left vehicle stoppers 24, 24. If the electric vehicle 5 advances toward the power transmission controller 15 from an entrance, i.e., the space between the front ends of the two guide parts 21 and 21, the electric vehicle 5 is guided to the power supply position along the guide parts 21 and 21. The power transmitting part 11 is arranged at approximately the center of the two guide parts 21 and 21 in the left-right direction so as not to be on the trucks of the wheels of the electric vehicle 5 if the electric vehicle 5 advances into the stopping position defined by the guide unit 20 (or goes out from the stopping position). The disposition of the units are so adjusted that the power transmission coil Lt of the power transmitting part 11 is opposite to a power reception unit 50 of the electric vehicle 5 if the tires of the electric vehicle 5 are stopped in a state where they are in contact with the vehicle stoppers 24.

The power transmitting part 11 is provided with a foreign object remover 30 for removing foreign object present on the top surface 121 of the housing 120. The foreign object remover 30 includes a blade 31 that moves while being in contact with the top surface 121 of the housing 120 and a drive motor 32 for driving the blade 31.

The drive motor 32 is accommodated in the housing 120 and is provided with a rotating shaft 32a rotating in response to a driving signal output from the controller 151 of the power transmission controller 15. The rotating shaft 32a is configured to extend perpendicularly upward so as to penetrate the top surface 121 of the housing 120. A sealant may be provided between the rotating shaft 32a and the penetrated surface of the housing 120 in order to prevent any foreign object from entering the inside of the housing 120.

The blade 31 is attached at the end of the rotating shaft 32a. The blade 31 is made of material with high flexibility and high impact resistance such as resin material or wire, for example. The blade 31 extends along the top surface 121 of the housing 120 and has the tip end positioned outside the periphery of the housing 120. In other words, the blade 31 has a length greater than the length between the center of the rotating shaft 32a and the periphery of the housing 120.

The controller 151 of the power transmission controller 15 outputs a driving signal to the drive motor 32 at a timing before power transmission is started, for example, to thereby rotate the rotating shaft 32a, which drives the blade 31. As the rotating shaft 32a rotates, the blade 31 rotates while being in contact with the top surface 111 of the housing 110 to thereby remove the foreign object present on the top surface 111 of the housing 110.

Note that the timing when the blade 31 is driven can arbitrarily be set. For example, a foreign object detector 155 for detecting any foreign object present on the top surface 111 of the housing 110 is provided. The controller 151 may be configured to drive the blade 31 if any foreign object is detected by the foreign object detector 155. Alternatively, the controller 151 may drive the blade 31 at a timing when the electric vehicle 5 to be charged is detected, at a timing when power transmission is started, at a periodic timing during which no power transmission is made or the like.

As described above in Embodiment 3, the power transmitter 10 and the guide unit 20 are formed as separate units, which increases the degree of freedom in layout when the non-contact power supply device 1 is installed.

In Embodiment 3, each of the vehicle stoppers 24 is configured to take the shape of a rectangular parallelepiped, though each of the vehicle stoppers 24 may be so configured as to have an inclined surface inclined forward similarly to Embodiment 2.

Embodiment 4

Embodiment 4 describes a configuration in which a power transmitting part 11 is accommodated in a housing with an openable or closeable cover.

Figure 7:
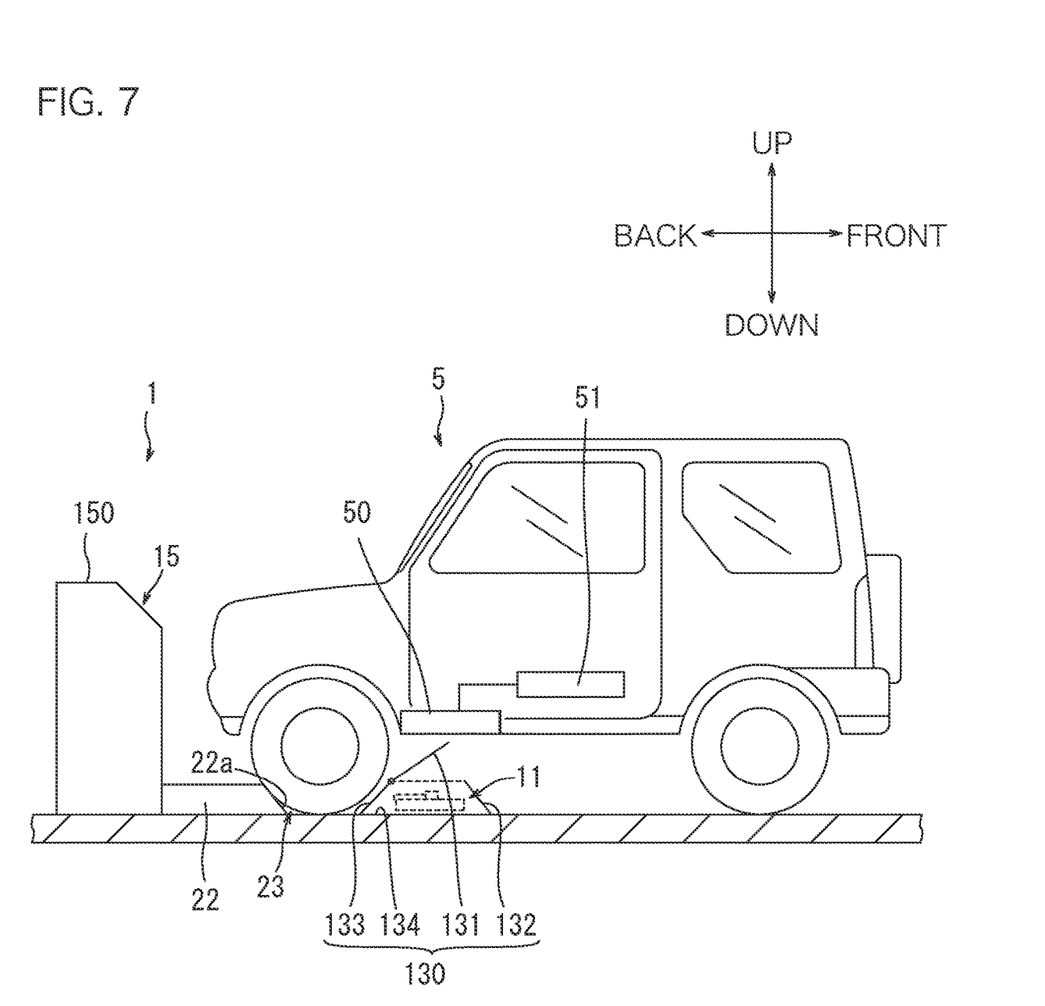
FIG. 7 is a schematic view illustrating a non-contact power supply device according to Embodiment 4.

FIG. 7 is a schematic view illustrating a non-contact power supply device according to Embodiment 4. The configuration of the non-contact power supply device 1 according to Embodiment 4 will be described below utilizing front and back, right and left and up and down directions indicated by the arrows illustrated in FIG. 7. The non-contact power supply device 1 according to Embodiment 4 is provided with a power transmitter 10, a guide unit 20 and a foreign object remover 30 similarly to those in Embodiment 1. Note that FIG. 7 illustrates the configuration from which the guide parts are removed for the sake of description.

The housing 120 of the power transmitting part 11 included in the power transmitter 10 takes the shape of a flat rectangular parallelepiped, for example. As described above, the power transmitting part 11 is provided with the foreign object remover 30 for removing foreign object present on the top surface 121 of the housing 120. The foreign object remover 30 includes a blade 31 that moves while being in contact with the top surface 111 of the housing 120 and a drive motor 32 for driving the blade 31.

In Embodiment 4, a housing 130 accommodating the power transmitting part 11 is provided. The housing 130 has a cover part 131 constituting a top surface, a first inclined surface 132 inclined downward from the cover part 131 to the front, a second inclined surface 133 inclined downward from the cover part 131 to the back and a bottom surface 134 opposite to the cover part. The lateral width of the cover part 131 is little greater than the width of the electric vehicle 5, which is assumed as an object to be charged. The first inclined surface 132 and the second inclined surface 133 are set to a relatively gentle angle of inclination to the extent that the wheels of the electric vehicle 5 can ride over them.

Furthermore, the housing 130 has a cover part opening and closing mechanism 140 (see FIG. 8A and FIG. 8B) that allows the cover part 131 to open by the weight of the electric vehicle 5 if the electric vehicle 5 is stopped at a stopping position defined by the guide unit 20.

Figure 8A:
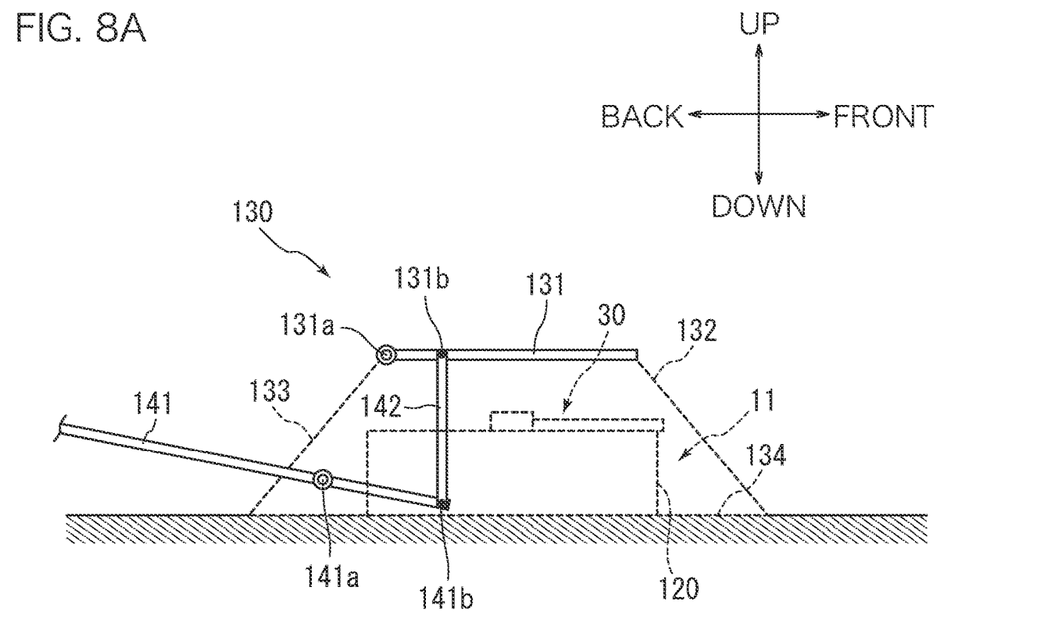
FIGS. 8A and 8B illustrate a cover part opening and closing mechanism.
Figure 8B:
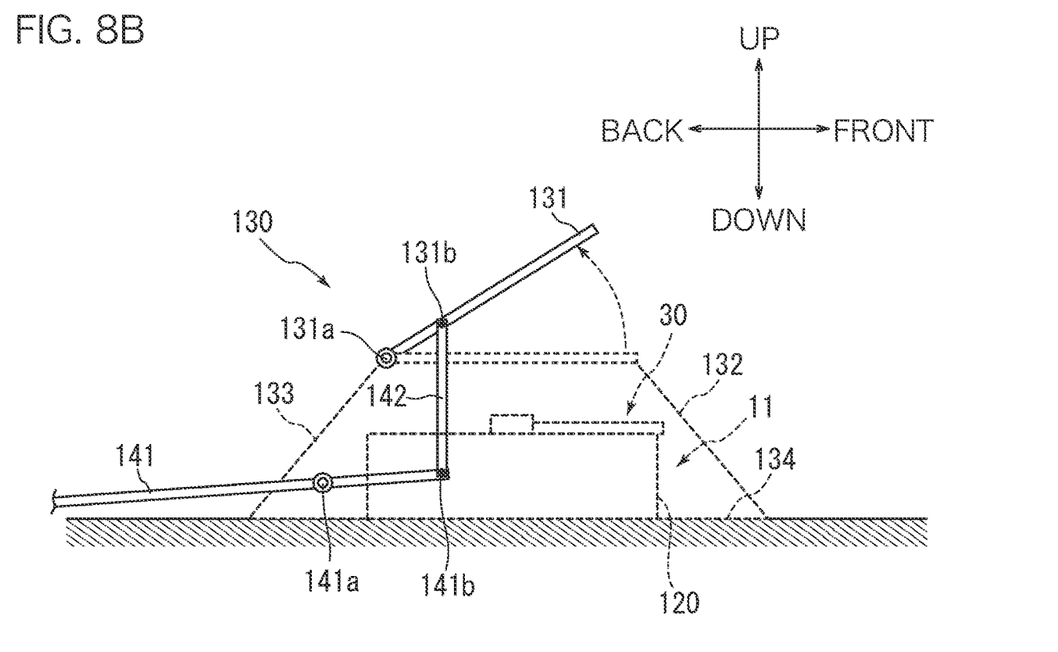
Figure 9:
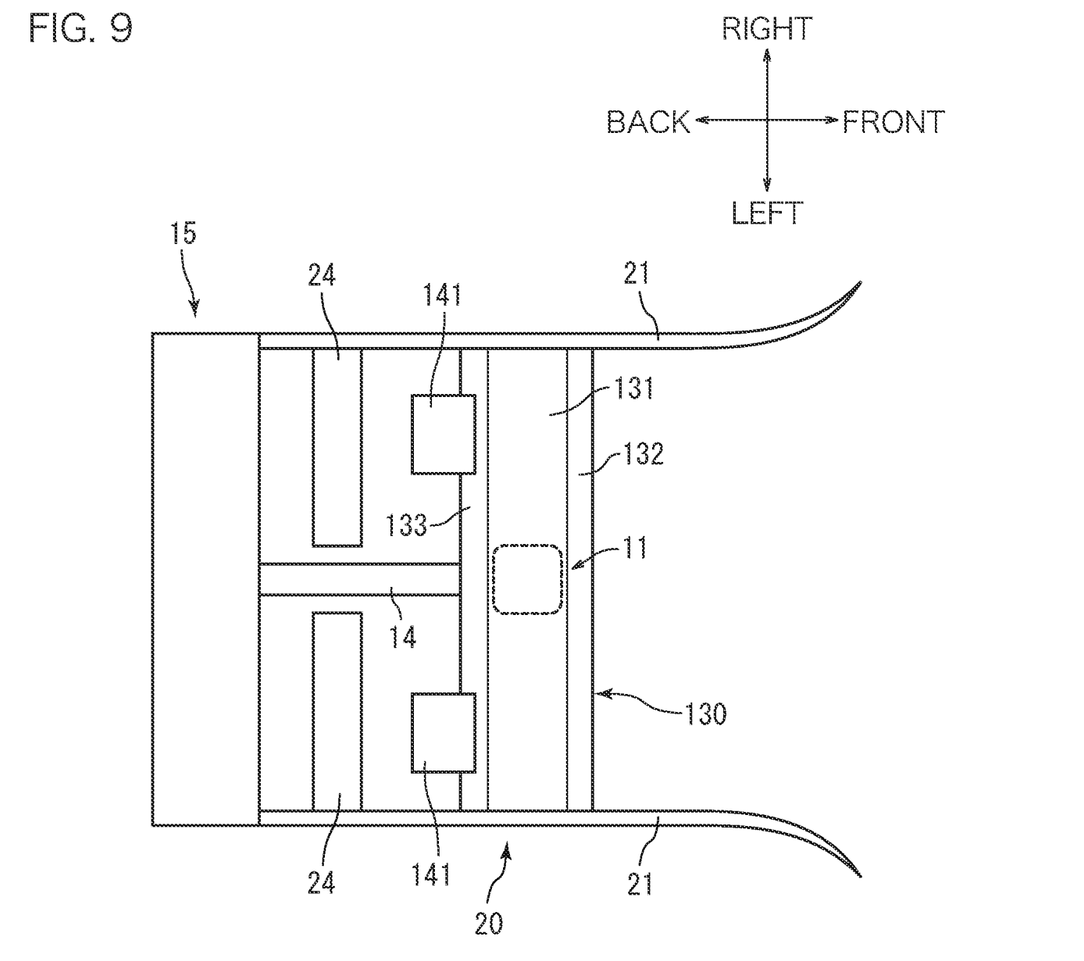
FIG. 9 is a plan view of the non-contact power supply device.

FIG. 8A and FIG. 8B illustrate a cover part opening and closing mechanism 140 while FIG. 9 is a plan view of the non-contact power supply device 1. The cover part opening and closing mechanism 140 includes pedal parts 141 each rotatably journaled on a rotating shaft 141a extending in the lateral direction, a coupling part 141b provided at the front end of the pedal part 141, and a link part 142 coupled with a coupling part 131b provided at the middle of the cover part 131. The pedal parts 141 are mounted at positions corresponding to the positions of the right and left tires of the electric vehicle 5 stopped at the stopping position as illustrated in FIG. 9. The cover part 131 is rotatably journaled on the rotating shaft 131a extending in the lateral direction that is positioned at the rear end of the cover part 131.

If the electric vehicle 5 is not stopped at the stopping position defined by the guide unit 20, each of the pedal parts 141 is journaled on the rotating shaft 141a so as to lift up the rear ends of the pedal parts 141. At this time, the cover part 131 is in a closed state.

If the electric vehicle 5 is stopped at the stopping position defined by the guide unit 20, each of the pedal parts 141 is depressed by each of the tires of the electric vehicle 5. If each of the pedal parts 141 is depressed by each of the tires of the electric vehicle 5, each of the pedal parts 141 rotates about the rotating shaft 141a so as to lift up the front end thereof. As the pedal part 141 rotates, the link part 142 causes the cover part 131 to rotate about the rotating shaft 131a to thereby open the cover part 131.

In Embodiment 4 as described above, if the electric vehicle 5 is stopped at the stopping position defined by the guide unit 20, the cover part 131 of the housing 130 accommodating the power transmitting part 11 can be opened by the weight of the electric vehicle 5. By opening the cover part 131, an electromagnetic wave from the power transmitting part 11 is not shut off, which increases charge efficiency.

If foreign object is present on the cover part 131 before the cover part 131 is opened, the foreign object can be shaken off by the cover part 131 being opened, which prevents reduction in charge efficiency due to the presence of the foreign object. That is, in the present embodiment, the cover part opening and closing mechanism 140 also functions as a foreign object remover. In this case, the power transmitting part 11 need not be mounted with the foreign object remover 30. In addition, the cover part 131 can be opened without the need for driving means such as an electric motor, etc., which reduces the operation cost.

In Embodiment 4, the power transmitter 10 and the guide unit 20 are formed as separate units though the power transmitter 10, the guide unit 20 and the foreign object remover 30 may be formed as a single unit.

Furthermore, in the present embodiment, the pedal parts 141 are provided on both sides though the pedal part 141 may be provided on one side and take the shape elongated in the left-right direction so as to be depressed by both of the right and left wheels of the electric vehicle.

It is to be understood that the embodiments disclosed here is illustrative in all respects and not restrictive. The scope of the present invention is defined by the appended claims, and all changes that fall within the meanings and the bounds of the claims, or equivalence of such meanings and bounds are intended to be embraced by the claims.

What is claimed is:

1. A non-contact power supply device supplying power in a non-contacting manner to a battery provided in an electric vehicle, comprising:
    a guide that defines a stopping position of the electric vehicle when the electric vehicle is supplied with power in the non-contacting manner; and
    a power transmitter that includes a power transmission coil and a housing accommodating the power transmission coil and that transmits power to the electric vehicle stopped at the stopping position from the power transmission coil, wherein
    the guide comprises
        two guide parts disposed apart from each other in a width direction of the electric vehicle with a space greater than a width of the electric vehicle, and
        a vehicle stopper that is disposed at a far side in a moving direction of the electric vehicle,
    the housing is disposed between the two guide parts and at a position closer to an entrance side than the vehicle stopper, and has an inclined surface inclined toward the far side,
    the vehicle stopper has an inclined surface inclined toward the entrance side, and
    front and rear positions of a wheel of the electric vehicle are physically restricted between the inclined surface of the housing and the inclined surface of the vehicle stopper.

2. The non-contact power supply device according to claim 1, wherein
    the space between the two guide parts in the width direction of the vehicle is made wider at an entrance side than at the far side in the moving direction of the electric vehicle.

3. The non-contact power supply device according to claim 1, wherein each of the two guide parts has a height greater than a top surface of the housing.

4. The non-contact power supply device according to claim 1, wherein the housing comprises
    a cover configured to be opened and closed, and
    an opening and closing mechanism that opens the cover by a weight of the electric vehicle when the electric vehicle is stopped at the stopping position.

* * * * *